(12) United States Patent
Isaac et al.

(10) Patent No.: US 7,251,710 B1
(45) Date of Patent: Jul. 31, 2007

(54) CACHE MEMORY SUBSYSTEM INCLUDING A FIXED LATENCY R/W PIPELINE

(75) Inventors: Roger D. Isaac, Austin, TX (US);
Mitchell Alsup, Austin, TX (US);
Rama S. Gopal, Austin, TX (US);
James K. Pickett, Austin, TX (US);
Michael A. Filippo, Manchaca, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 363 days.

(21) Appl. No.: 10/755,734

(22) Filed: Jan. 12, 2004

(51) Int. Cl.
*G06F 13/00* (2006.01)
(52) U.S. Cl. .................. 711/118; 711/100; 711/111; 711/112; 711/113; 711/167; 711/169; 710/6; 710/36; 710/39; 365/49
(58) Field of Classification Search .............. 711/119, 711/130, 123, 100, 101, 111, 112, 113, 118, 711/167, 169; 710/6, 36, 39; 365/49
See application file for complete search history.

(56) References Cited

U.S. PATENT DOCUMENTS

| | | | |
|---|---|---|---|
| 6,145,054 A * | 11/2000 | Mehrotra et al. ........... | 711/119 |
| 6,154,812 A * | 11/2000 | Hetherington et al. ...... | 711/122 |
| 6,202,126 B1 * | 3/2001 | Van Doren et al. ......... | 711/118 |
| 6,345,335 B1 * | 2/2002 | Flynn ......................... | 711/123 |
| 6,418,516 B1 * | 7/2002 | Arimilli et al. ............. | 711/138 |
| 6,629,205 B2 * | 9/2003 | Cypher ....................... | 711/118 |
| 6,775,749 B1 * | 8/2004 | Mudgett et al. ............ | 711/146 |
| 2001/0029573 A1 | 10/2001 | Johnson ...................... | 711/128 |
| 2002/0069326 A1 | 6/2002 | Richardson et al. ........ | 711/122 |
| 2003/0154345 A1 * | 8/2003 | Lyon .......................... | 711/122 |
| 2003/0154346 A1 * | 8/2003 | Gruner et al. .............. | 711/130 |
| 2003/0217236 A1 * | 11/2003 | Rowlands ................... | 711/145 |
| 2004/0024974 A1 * | 2/2004 | Gwilt et al. ................ | 711/145 |

* cited by examiner

*Primary Examiner*—Stephen C. Elmore
*Assistant Examiner*—Daniel Kim
(74) *Attorney, Agent, or Firm*—Meyertons Hood Kivlin Kowert & Goetzel, P.C.; B. Noël Kivlin; Stephen J. Curran (57) ABSTRACT

A cache memory subsystem including a fixed latency read/write pipeline. The cache memory subsystem includes a cache storage which may be configured to store a plurality of cache lines of data. The cache memory subsystem further includes a scheduler which may be configured to schedule reads and writes of information associated with the cache storage using a fixed latency pipeline. In response to scheduling a read request, the scheduler may be further configured to cause an associated write to occur a fixed number of cycles after the scheduling of the read request.

26 Claims, 4 Drawing Sheets

CACHE MEMORY SUBSYSTEM INCLUDING A FIXED LATENCY R/W PIPELINE

BACKGROUND OF THE INVENTION

1. Field of the Invention

This invention relates to cache memories and, more particularly, to cache memory access mechanisms.

2. Description of the Related Art

Typical computer systems may contain one or more microprocessors which may be connected to one or more system memories. The processors may execute code and operate on data that is stored within the system memories. It is noted that as used herein, the term "processor" is synonymous with the term microprocessor. To facilitate the fetching and storing of instructions and data, a processor typically employs some type of memory system. In addition, to expedite accesses to the system memory, one or more cache memories may be included in the memory system. For example, some microprocessors may be implemented with one or more levels of cache memory. As used herein, a the level of the cache refers the cache's proximity to the microprocessor core relative to another cache's proximity to the microprocessor core. In this example, the L1 cache is considered to be at a higher level than the L2 cache. In a typical microprocessor, a level one (L1) cache and a level two (L2) cache may be used, while some newer processors may also use a level three (L3) cache. In many legacy processors, the L1 cache may reside on-chip and the L2 cache may reside off-chip. However, to further improve memory access times, many newer processors may use an on-chip L2 cache.

The L2 cache is often implemented as a unified cache, while the L1 cache may be implemented as a separate instruction cache and a data cache. The L1 data cache is used to hold the data most recently read or written by the software running on the microprocessor. The L1 instruction cache is similar to L1 data cache except that it holds the instructions executed most recently and or frequently. It is noted that for convenience the L1 instruction cache and the L1 data cache may be referred to simply as the L1 cache, as appropriate. The L2 cache may be used to hold instructions and data that do not fit in the L1 cache. The L2 cache may be exclusive (e.g., it stores information that is not in the L1 cache) or it may be inclusive (e.g., it stores a copy of the information that is in the L1 cache).

Memory subsystems typically use some type of cache coherence mechanism to ensure that accurate data is supplied to a requester. The cache coherence mechanism typically uses the size of the data transferred in a single request as the unit of coherence. The unit of coherence is commonly referred to as a cache line. In some processors, for example, a given cache line may be 64 bytes, while some processors employ a cache line of 32 bytes. In yet other processors, other numbers of bytes may be included in a single cache line. If a request misses in the L1 and L2 caches, an entire cache line of multiple words may be transferred from main memory to the L2 and L1 caches.

During a read or write to cacheable memory, the L1 cache is first checked to see if the requested information (e.g., instruction or data) is available. If the information is available, a hit occurs. If the information is not available, a miss occurs. If a miss occurs, then the L2 cache may be checked. Thus, when a miss occurs in the L1 cache but hits within, L2 cache, the information may be transferred from the L2 cache to the L1 cache in an L1 cache line fill. As described above, the amount of information transferred between the L2 and the L1 caches is typically a cache line. If a miss occurs in the L1 cache and the L2 cache, the cache line containing the requested information may be retrieved from system memory. The retrieved cache line may be stored in the L2 cache as an L2 cache line fill. Further, the requested information may be stored in the L1 cache as an L1 cache line fill and the requested information may also be returned to the requestor. In addition, depending on the space available in the L1 cache, a cache line may be evicted from the L1 cache to make room for the new cache line and may be subsequently stored in L2 cache. If the cache line that is being evicted is in a modified state, the microprocessor may perform a cache line write-back to system memory when it performs the cache line fill. These write-backs help maintain coherency between the caches and system memory.

In many conventional microprocessors a victim buffer may be used between cache hierarchies to temporarily store cache lines evicted from a higher-level cache. The victim buffer may allow cache lines to be evicted from a higher-level cache while a lower-level cache in the hierarchy is busy performing other tasks. When the lower-level cache is ready, the cache lines stored in the victim buffer may be transferred to the lower-level cache. Although victim buffers may be useful, they may require complex logic to control the transfer of data between the cache hierarchy and they may require cache bus overhead in the form of back-probes from the lower-level cache to the higher-level cache.

SUMMARY OF THE INVENTION

Various embodiments of a cache memory subsystem including a fixed latency read/write pipeline are disclosed. In one embodiment, a cache memory subsystem includes a cache storage which may be configured to store a plurality of cache lines of data. The cache memory subsystem further includes a scheduler which may be configured to schedule reads and writes of information associated with the cache storage using a fixed latency pipeline. In response to scheduling a read request, the scheduler may be further configured to cause an associated write to occur a fixed number of cycles after the scheduling of the read request.

In one specific implementation, the associated write may correspond to a cache line of victim data which has been evicted from a higher-level cache such as an L1 cache, for example. Further, the scheduler may be further configured to perform the associated write to a storage location within the cache storage having an address corresponding to the cache line of victim data.

In another specific implementation, the associated write may correspond to a cache line of fill data from a system memory. In addition, the scheduler may be further configured to perform the associated write to a storage location within the cache storage having an address corresponding to the read request.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 1:
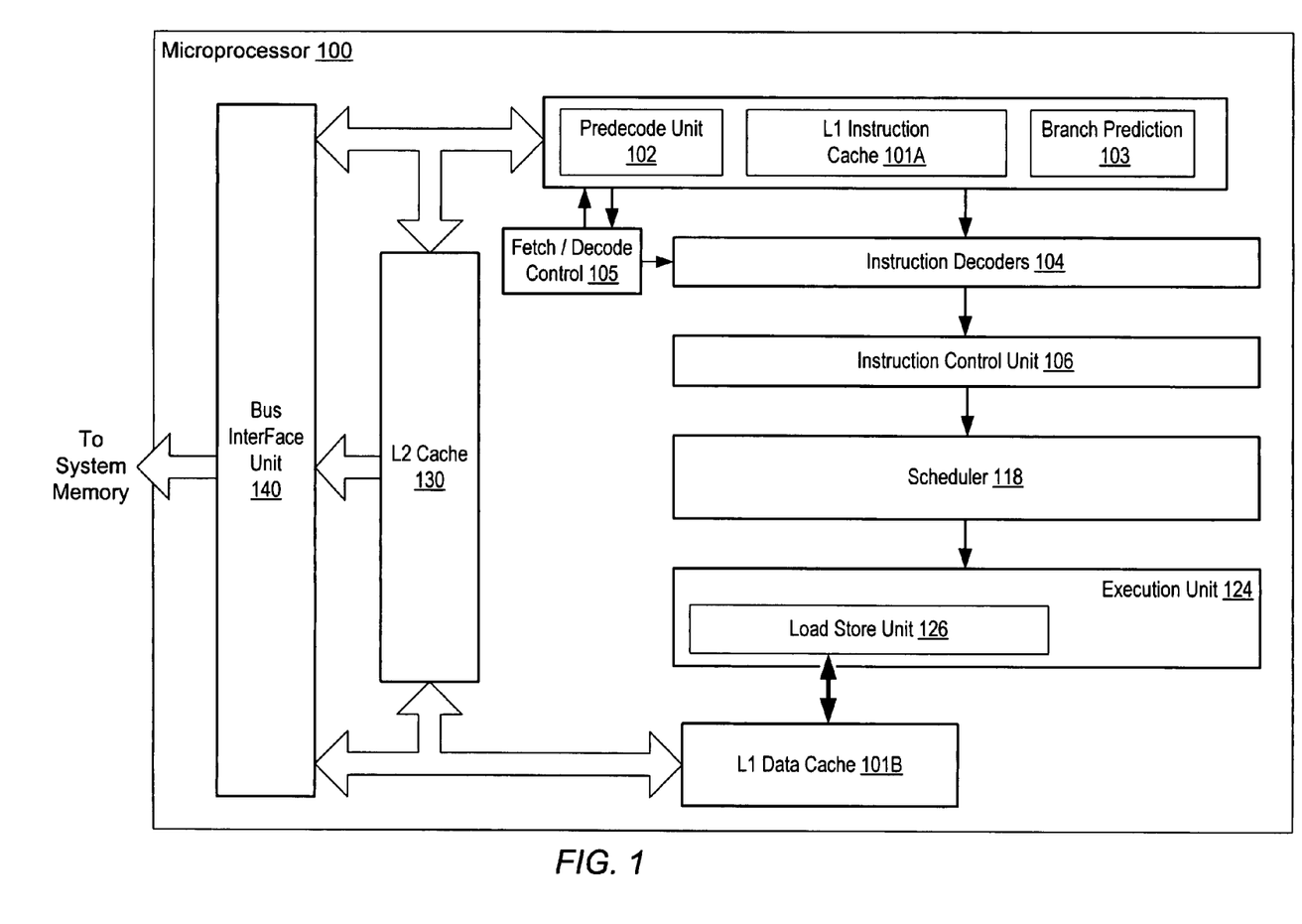
FIG. 1 is a block diagram of one embodiment of a microprocessor.

Turning now to FIG. 1, a block diagram of one embodiment of an exemplary microprocessor 100 is shown. Microprocessor 100 is configured to execute instructions stored in a system memory (not shown in FIG. 1). Many of these instructions operate on data stored in the system memory. It is noted that the system memory may be physically distributed throughout a computer system and may be accessed by one or more microprocessors such as microprocessor 100, for example. In one embodiment, microprocessor 100 is an example of a microprocessor which implements the x86 architecture such as an Athlon™ processor, for example. However, other embodiments are contemplated which include other types of microprocessors.

In the illustrated embodiment, microprocessor 100 includes cache system including a first level one (L1) cache and a second L1 cache: an instruction cache 101A and a data cache 101B. Depending upon the implementation, the L1 cache may be a unified cache or a bifurcated cache. In either case, for simplicity, instruction cache 101A and data cache 101B may be collectively referred to as L1 cache where appropriate. Microprocessor 100 also includes a pre-decode unit 102 and branch prediction logic 103 which may be closely coupled with instruction cache 101A. Microprocessor 100 also includes a fetch and decode control unit 105 which is coupled to an instruction decoder 104; both of which are coupled to instruction cache 101A. An instruction control unit 106 may be coupled to receive instructions from instruction decoder 104 and to dispatch operations to a scheduler 118. Scheduler 118 is coupled to receive dispatched operations from instruction control unit 106 and to issue operations to execution unit 124. Execution unit 124 includes a load/store unit 126 which may be configured to perform accesses to data cache 101B. Results generated by execution unit 124 may be used as operand values for subsequently issued instructions and/or stored to a register file (not shown). Further, microprocessor 100 includes an on-chip L2 cache 130 which is coupled between instruction cache 101A, data cache 101B and the system memory. It is noted that alternative embodiments are contemplated in which L2 cache memory 130 resides off-chip.

Instruction cache 101A may store instructions before execution. Functions which may be associated with instruction cache 101A may be instruction fetches (reads), instruction pre-fetching, instruction pre-decoding and branch prediction. Instruction code may be provided to instruction cache 106 by pre-fetching code from the system memory through buffer interface unit 140 or as will be described further below, from L2 cache 130. Instruction cache 101A may be implemented in various configurations (e.g., set-associative, fully-associative, or direct-mapped). In one embodiment, instruction cache 101A may be configured to store a plurality of cache lines where the number of bytes within a given cache line of instruction cache 101A is implementation specific. In one embodiment, a portion of instruction cache 101A may be used as a translation-lookaside buffer (TLB) for storing the most recently used virtual-to-physical address translations. Further, in one embodiment instruction cache 101A may be implemented in static random access memory (SRAM), although other embodiments are contemplated which may include other types of memory. It is noted that in one embodiment, instruction cache 101A may include control circuitry (not shown) for controlling cache line fills, replacements, and coherency, for example.

Instruction decoder 104 may be configured to decode instructions into operations which may be either directly decoded or indirectly decoded using operations stored within an on-chip read-only memory (ROM) commonly referred to as a microcode ROM or MROM (not shown). Instruction decoder 104 may decode certain instructions into operations executable within execution unit 124. Simple instructions may correspond to a single operation. In some embodiments, more complex instructions may correspond to multiple operations.

Instruction control unit 106 may control dispatching of operations to the execution unit 124. In one embodiment, instruction control unit 106 may include a reorder buffer for holding operations received from instruction decoder 104. Further, instruction control unit 106 may be configured to control the retirement of operations.

The operations and immediate data provided at the outputs of instruction control unit 106 may be routed to scheduler 118. Scheduler 118 may include one or more scheduler units (e.g. an integer scheduler unit and a floating point scheduler unit). It is noted that as used herein, a scheduler is a device that detects when operations are ready for execution and issues ready operations to one or more execution units. For example, a reservation station may be a scheduler. Each scheduler 118 may be capable of holding operation information (e.g., bit encoded execution bits as well as operand values, operand tags, and/or immediate data) for several pending operations awaiting issue to an execution unit 124. In some embodiments, each scheduler 118 may not provide operand value storage. Instead, each scheduler may monitor issued operations and results available in a register file in order to determine when operand values will be available to be read by execution unit 124. In some embodiments, each scheduler 118 may be associated with a dedicated one of execution unit 124. In other embodiments, a single scheduler 118 may issue operations to more than one of execution unit 124.

In one embodiment, execution unit 124 may include an execution unit such as and integer execution unit, for example. However in other embodiments, microprocessor 100 may be a superscalar processor, in which case execution unit 124 may include multiple execution units (e.g., a plurality of integer execution units (not shown)) configured to perform integer arithmetic operations of addition and subtraction, as well as shifts, rotates, logical operations, and branch operations. In addition, one or more floating-point units (not shown) may also be included to accommodate floating-point operations. One or more of the execution units may be configured to perform address generation for load and store memory operations to be performed by load/store unit 126.

Load/store unit 126 may be configured to provide an interface between execution unit 124 and data cache 101B. In one embodiment, load/store unit 126 may be configured with a load/store buffer (not shown) with several storage locations for data and address information for pending loads or stores. The load/store unit 126 may also perform dependency checking on older load instructions against younger store instructions to ensure that data coherency is maintained.

Data cache 101B is a cache memory provided to store data being transferred between load/store unit 126 and the system memory. Similar to instruction cache 101A described above, data cache 101B may be implemented in a variety of specific memory configurations, including a set associative configuration. In one embodiment, data cache 101B and instruction cache 101A are implemented as separate cache units. Although as described above, alternative embodiments are contemplated in which data cache 101B and instruction cache 101A may be implemented as a unified cache. In one embodiment, data cache 101B may store a plurality of cache lines where the number of bytes within a given cache line of data cache 101B is implementation specific. Similar to instruction cache 101A, in one embodiment, a portion of data cache 101B may be used as a translation look aside buffer (TLB) (not shown). In one embodiment data cache 101B may also be implemented in static random access memory (SRAM), although other embodiments are contemplated which may include other types of memory. It is noted that in one embodiment, data cache 101B may include control circuitry (not shown) for controlling cache line fills, replacements, and coherency, for example.

L2 cache 130 is also a cache memory and it may be configured to store instructions and/or data. In the illustrated embodiment, L2 cache 130 may be an on-chip cache and may be configured as either fully associative or set associative. In one embodiment, L2 cache 130 may store a plurality of cache lines. It is noted that L2 cache 130 may include control circuitry (not shown in FIG. 1) for scheduling requests, controlling cache line fills and replacements, and coherency, for example. In addition, as will be described in greater detail below in conjunction with the descriptions of FIG. 2 through FIG. 4, L2 cache 130 may be configured to schedule requests using a fixed-latency read/write pipeline such that in response to scheduling a read request, a write phase is scheduled to occur a fixed number of cycles after scheduling of the read request.

Bus interface unit 140 may be configured to transfer instructions and data between system memory and L2 cache 130 and between system memory and L1 instruction cache 101A and L1 data cache 101B. In one embodiment, bus interface unit 140 may include buffers (not shown) for buffering write transactions during write cycle streamlining.

Figure 2:
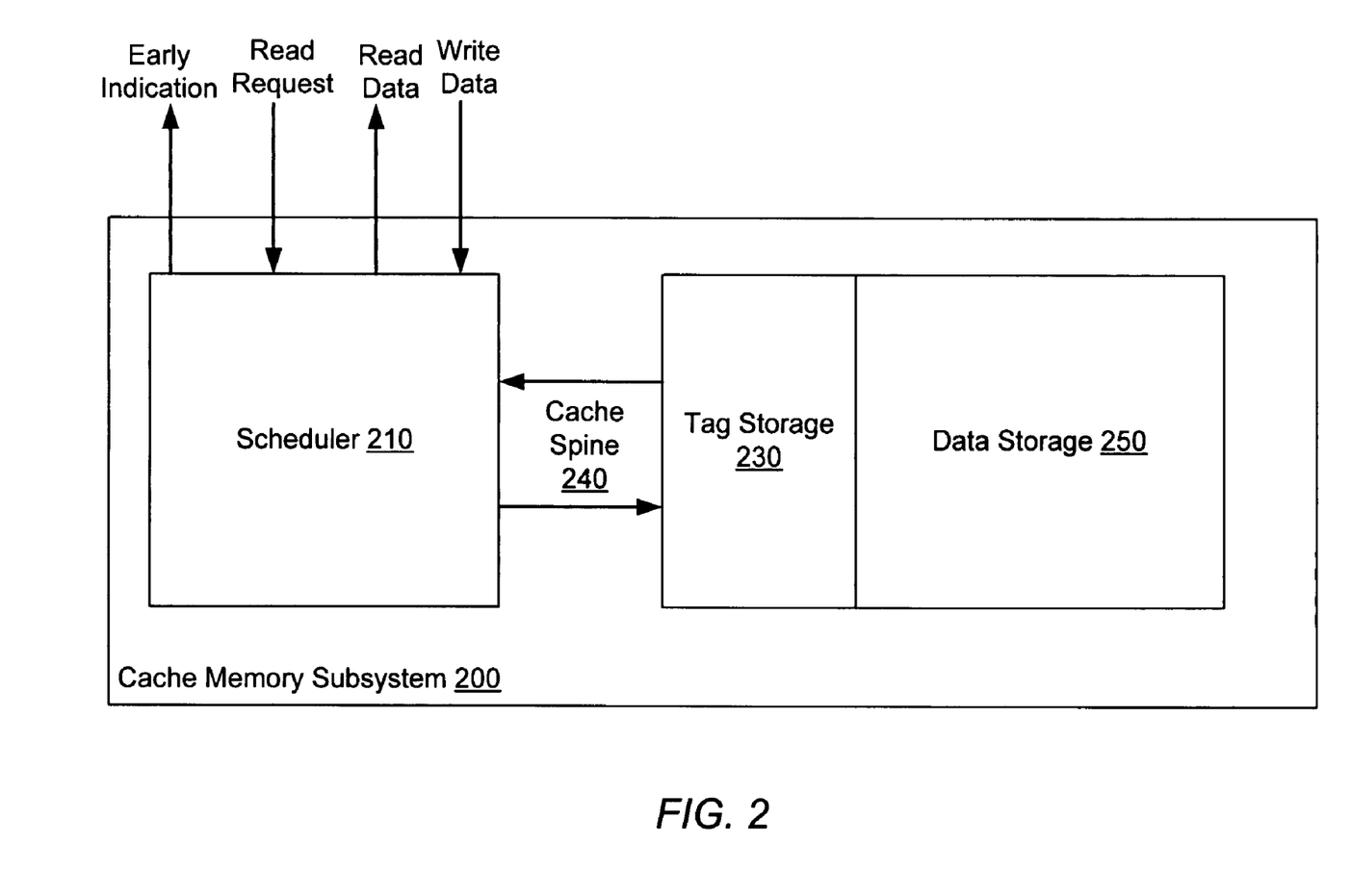
FIG. 2 is a block diagram of one embodiment of a cache memory subsystem.

Referring to FIG. 2, a block diagram of one embodiment of a cache memory subsystem is shown. Components that correspond to those shown in FIG. 1 are numbered identically for simplicity and clarity. Cache memory subsystem 200 includes a cache memory which includes a data storage 250 coupled to a tag storage 230. Further, cache memory subsystem 200 includes a scheduler unit 210 which is coupled to tag storage 230 via a cache spine 240 which may serve to convey information between scheduler 210 and tag storage 230 and further between data storage 250. In one embodiment, data storage 250, tag 230 and scheduler 210 may be used in an L2 cache subsystem such as L2 cache 130 of FIG. 1, for example. It is noted however, that in other embodiments, data storage 250, tag storage 230 and scheduler 210 may be used in any cache subsystem.

Data storage 250 may include a plurality of storage units which may be arranged into independently accessible storage blocks (not shown in FIG. 2). Data storage 250 is configured to store cache lines of data. It is noted that in one embodiment, a different block may be accessed concurrently, while the same storage block may be accessed after a subsequent request is complete.

Tag storage 230 may be configured to store cache line tag information in a plurality of storage units which may also be arranged into independently accessible storage blocks (not shown in FIG. 2). Tag storage 230 may include a plurality of tags each corresponding to one of the independently accessible storage blocks of data storage 250. The address information in a tag is used to determine if a given piece of data is present in the cache during a memory request. For example, a memory request includes an address of the requested data. Compare logic (not shown) compares the requested address with the address information within each tag stored within tag storage 230. If there is a match between the requested address and an address associated with a given tag, a hit is indicated as described above. If there is no matching tag, a miss is indicated.

Scheduler 210 may include one or more request queues and control logic (not shown) which may be configured to store incoming cache read requests and to select and schedule those requests for conveyance on cache spine 240. In one embodiment, scheduler 210 may be configured to receive read requests from such sources as cache misses from L1 instruction cache 101A or L1 data cache 101B, both of FIG. 1. It is noted that in such an embodiment, a read request resulting from an L1 miss may be conveyed to scheduler 210 without an intervening victim buffer, such as described above and which may be used in many conventional cache hierarchies. In addition, in one embodiment, a read request may be received as an L2 cache line fill from a system memory (not shown) or further a read request may be received as a cache miss from a TLB.

Generally speaking, cache requests may come in the form of a read request, a write request or an update request. Since read requests to cache memory subsystem 200 will typically at some point necessitate a subsequent write cycle, in one embodiment, scheduler 210 may schedule a write cycle to occur some fixed number of cycles after scheduling the read request. As described above, conventional processors may store evicted cache lines from cache misses in a victim buffer and then write the cache lines to a cache such as an L2 cache, for example, at some time later. To guarantee that these evicted cache lines will get written into cache memory subsystem 200 without the use of a victim buffer, scheduler 210 pipelines the read and subsequent write.

Scheduler 210 may provide a fixed latency pipeline mechanism to schedule reads and writes into cache memory subsystem 200. In one embodiment, scheduler 210 may cause a write data phase to occur a fixed number of cycles after a read request is received and scheduled. By scheduling a write data phase in response to scheduling a read, scheduler 210 may guarantee that the write will occur, thereby eliminating the need for a victim buffer. If the read request is from an L1 cache miss, the write cycle may write the victim data to the address associated with the victim data since a copy of the victim data cache line is present in data storage 250. If the read request results in miss within cache memory subsystem 200, the write cycle may not be used.

In one embodiment, if a subsequent read request collides with a write in the write data phase of the pipeline, the subsequent read may be held off and scheduled at a later time. In another embodiment, although two read accesses to the same bank (i.e., storage block) may be held off as described above, cache memory subsystem 200 may accommodate two read accesses to different banks resulting in more than one pipeline executing concurrently. Hence the subsequent read request to a different bank may be scheduled.

In addition, scheduler 210 may be configured to provide an early indication signal for use by higher-level cache subsystems or another requester. The early indication signal is indicative that a read request has been scheduled and to expect a read response with the corresponding data some fixed number of cycles later. The early indication signal may be sent at some predetermined time before the read response will be sent. In one embodiment, the predetermined time may be programmable. The programmability, in effect, gives the pipe a fixed latency as seen from the perspective of a requester. The pipeline may have varying latencies from one process lot to the next or additional pipe stages may be added or removed depending on such factors as the size of the data storage 250. Thus the pipeline may be shifted an arbitrary number of cycles in either direction while retaining full functionality. For example, if after processing, a particular lot of wafers yields a cache memory subsystem 200 which provides data faster than some other lots, the early indication signal may be provided earlier in the pipeline. On the other hand, if a particular lot of wafers yields a cache memory subsystem 200 which provides data slower than some other lots, the early indication signal may be provided later in the pipeline. Thus, the programmability may allow cache memory subsystem 200 to compensate for varying pipeline latencies and still provide a fixed latency as seen from the perspective of a requestor. In addition, the programmability may allow cache memory subsystem 200 to adjust to the timing of different cache subsystems that use it as a resource. The fixed latency pipeline mechanism is described in greater detail below in conjunction with the descriptions of FIG. 3 and FIG. 4.

The programmability described above may be implemented in a variety of ways. For example, in one embodiment, a register containing selectable values may be used. In another embodiment, to select a given latency, fuses or wire jumpers located on the integrated circuit may be purposely blown or laser cut, respectively. Accordingly, the latency of the pipeline may be adjusted to match the timing of the surrounding components.

If a read request misses in cache memory subsystem 200, in one embodiment the pipeline may continue to execute since data may be provided by the system memory as a cache line fill to both the L1 cache and cache memory subsystem 200. For example, the early indication signal may be sent to the requesting L1 cache. Cache memory subsystem 200 may still initiate a data write to the L1 cache, however, since there is no data, the data may be invalidated. In one embodiment, the L1 cache may be configured to detect the invalid data cycle and to expect another early indication from the system memory with a subsequent data write having valid data. However, in such an embodiment, the L1 cache may not be able to distinguish whether the L1 fill data is from cache memory subsystem 200 or from the system memory since the latency from either early indication to the arrival of the L1 fill data should be the same. In addition, the valid data from the system may be written into cache memory subsystem 200 in the same stage in the pipeline that it would have if the data were victim data from the L1 cache.

Figure 3:
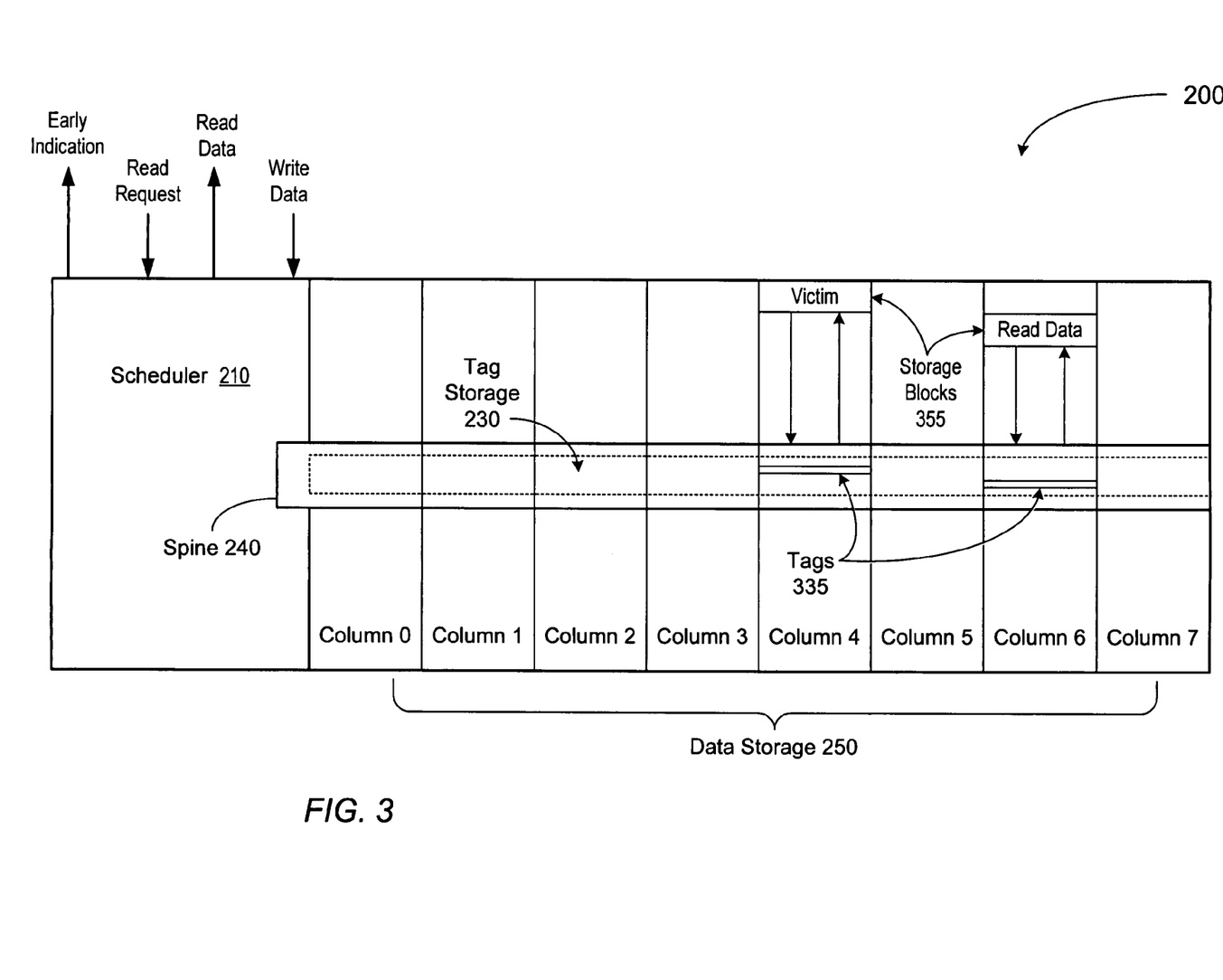
FIG. 3 is a diagram illustrating various components of the embodiment of cache memory subsystem 200 of FIG. 2.

Turning to FIG. 3, a diagram illustrating various components of the embodiment of cache memory subsystem 200 of FIG. 2 is shown. Components that correspond to those shown in FIG. 2 are numbered identically for simplicity and clarity. Cache memory subsystem 200 includes a scheduler 210 which is coupled to a tag storage 230 and to a data storage 250 via a cache spine 240.

In the illustrated embodiment, data storage 250 is comprised of columns 0 through column 7. Columns 0–7 are illustrative of how a plurality of storage blocks such as storage blocks 355 may be arranged within data storage 250. The storage blocks 355 may be configured to store cache lines of data. It is noted that although eight columns are shown in FIG. 3, other embodiments are contemplated in which other numbers of columns may be used.

In the illustrated embodiment, spine 240 traverses tag storage 230 and data storage 250 and may include cache buses in which signals may be conveyed between scheduler 210, tag storage 230 and data storage 250.

As described above in conjunction with the description of FIG. 2, scheduler 210 may be configured to schedule the requests using a fixed latency pipeline mechanism to schedule reads and writes. Scheduler 210 may be configured to store incoming cache read requests and to select and schedule those requests for conveyance on cache spine 240. In response to scheduling a given read request, scheduler 210 may also be configured to schedule an associated write data phase.

Processing a request requires a series of operations referred to as stages. Each stage may take a fixed amount of time or 'cycles'. For example, the fixed amount of time it takes scheduler 210 to schedule a read request may be one time segment. The fixed amount of time it takes the read request to be conveyed upon spine 240 and for the signals to traverse the spine and reach tag storage 230 may be another time segment. Therefore, each of these fixed amounts of time may be added in series to calculate the total time (i.e., total number of cycles) for a read request to be processed and the corresponding data to be returned to the requestor. Given that each stage is processed serially, the process may be thought of in terms of a pipeline. Thus the various components illustrated in FIG. 3 will be described in greater detail below as they relate to the pipeline. As will described in greater detail below in conjunction with the description of FIG. 4, scheduler 210 accounts for the various time segments associated with each pipeline stage while providing an apparent fixed latency to a requestor.

Figure 4:
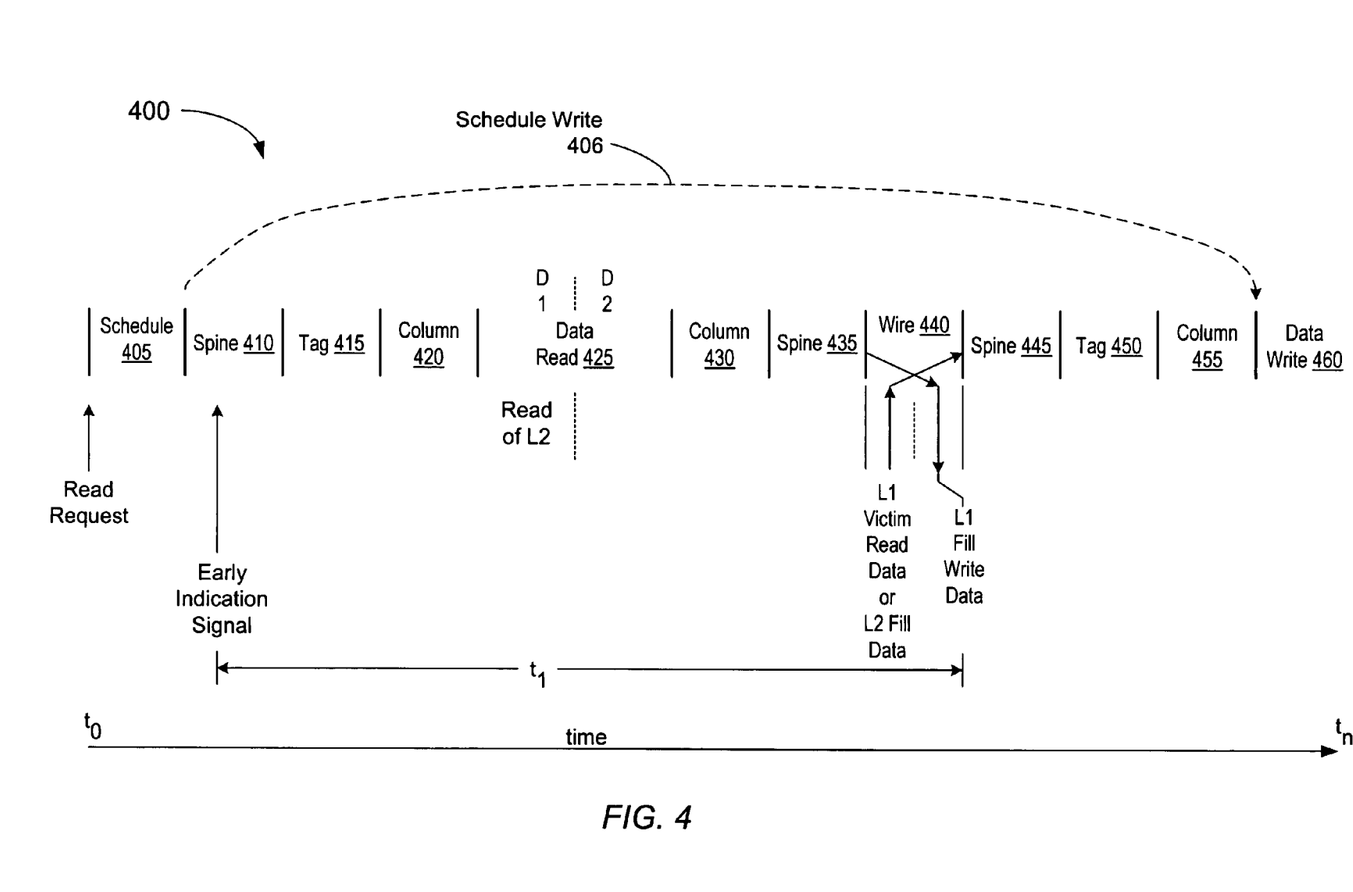
FIG. 4 is a diagram of an exemplary cache memory pipeline structure of one embodiment of the cache memory subsystem of FIG. 2 and FIG. 3.

Referring to FIG. 4, a diagram of an exemplary fixed latency cache memory read/write pipeline structure implemented by one embodiment of the cache subsystem of FIG. 2 and FIG. 3 is shown. Pipeline 400 includes 11 stages. Each stage is representative of the time it takes for cache memory subsystem 200 to perform an operation, or the time it takes for a signal to travel (i.e., latency) in response to an operation. As described above each stage takes some fixed amount of time to complete. Accordingly, pipeline 400 is shown referenced to a timeline which begins at time $t_0$ and continues to time $t_n$.

To describe the operation of cache memory subsystem 200 and pipeline 400, refer collectively to FIG. 3 and FIG. 4. Beginning on the left side of pipeline 400, the first stage is a scheduling stage 405. Scheduling stage 405 corresponds to the time it takes for scheduler 210 to receive a read request from a source such as an L1 cache or TLB cache, for example, and to schedule a read of the requested cache line. In addition, scheduler 210 may schedule a write cycle in response to scheduling the read. This is illustrated by the dashed line 406. For example, if a read misses within an L1 cache, and the read is then requested of cache memory subsystem 200, scheduler 210 may schedule the read and also schedule a write to occur some predetermine amount of time (i.e., cycles) after the scheduling of the read. Since scheduler 210 expects that victim data will be sent from the L1 cache some number of cycles later, scheduler 210 also schedules a write of the victim data within data storage 250, thereby guaranteeing that the write will occur. In FIG. 3, one of storage blocks 355 is designated as victim. As described above, in an inclusive cache hierarchy, a lower-level cache includes a copy of each cache line stored in a higher-level cache. Accordingly, the write cycle will already have a storage location within data storage 250 to write the victim data when it arrives.

At some predetermined time (e.g., $t_1$) before the read response (e.g., L1 Fill Write Data) is scheduled arrive at the requestor, scheduler 210 may issue an early indication signal to the requestor. As described above, this predetermined time may be programmable to match the latency of the pipeline.

The next stage is spine stage 410. Spine stage 410 corresponds to the time it takes for the read request to propagate down spine 240 to tag storage 230. The next stage is tag stage 415. Tag stage 415 corresponds to the time it takes for tag logic within tag storage 230 to determine whether there is a hit for the requested cache line. Assuming there is a hit, the next stage is column stage 420. Column stage 420 corresponds to the time it takes for the read request to propagate to the storage block containing the requested read data. For example, in FIG. 3, column stage 420 may be represented by an arrow pointing from spine 240 to a storage block labeled read data within one of storage blocks 355.

The next stage is data read stage 425 and is shown occupying two stages. Data read stage 425 corresponds to the time it takes for the data to be read from a given storage block within data storage 250. It is noted that other embodiments may use other numbers of read data stages depending on the latency associated with storage block access time of a given memory. The next stage is column stage 430. Similar to column stage 420 above, column stage 430 corresponds to the time it takes for the read data to propagate from the storage block containing the requested read data to spine 240. For example, in FIG. 3, column stage 430 may be represented by an arrow pointing from the storage block labeled read data within one of storage blocks 355 to spine 240. The next stage is spine stage 435 which corresponds to the time it takes for the read data to traverse back across spine 240 to scheduler 210.

The next stage is wire stage 440. Wire stage 440 corresponds to the time it takes for the victim data to be sent from the L1 cache, for example, and to be received by cache memory subsystem 200. Wire stage 440 further corresponds to the time it takes for the read data to be sent from the cache memory subsystem 200 to the L1 cache, for example. It is noted that in one embodiment, wire stage 440 may be programmable to accommodate different latencies associated with the returning of victim data from an L1 cache and fill data for the system.

The next stage is spine stage 445 which corresponds to the time it takes for the victim data or the fill data to traverse spine 240. The next stage is tag stage 450, which corresponds to the time it takes for the tag logic to match on the victim data address. If the data is fill data, the fill data will not match and tag logic may direct the data to be stored in a storage location selected by a least recently used algorithm. The next stage is column stage 455, which corresponds to the time it takes for the victim data to propagate to the storage block containing the copy of victim data or for the fill data to propagate to the designated storage block. For example, in FIG. 3, in the case of a victim data write, column stage 455 may be represented by an arrow pointing from spine 240 to the storage block labeled victim data within one of storage blocks 355. It is noted that, depending on the coherency state of the victim data, the actual data written may simply be coherency state information or pre-decode information as necessary.

The last stage is data write stage 460 corresponding to the time it takes to write the victim or fill data into the corresponding storage block.

As described above, if a subsequent read request to the same bank of data storage 250 is received by scheduler 210 prior to the completion of the write data phase, in one embodiment, that subsequent read may be held off until the write data phase completes. For example, scheduler 210 may detect a possible collision and may hold off read until the write phase is complete.

It is noted that the illustrated embodiment is only an exemplary pipeline and that other embodiments are contemplated in which other numbers of stages may be used. It is further noted that a given stage may take an arbitrary amount of time and thus an arbitrary number of cycles and is implementation dependent.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A cache memory subsystem comprising:
   a cache storage configured to store a plurality of cache lines of data;
   a scheduler configured to schedule reads and writes of information to said cache storage using a fixed latency pipeline;
   wherein in response to scheduling a read request to said cache storage, said scheduler is further configured to cause an associated write to said cache storage to occur a fixed number of cycles after said scheduling a read request.

2. The cache memory subsystem as recited in claim 1, wherein said associated write corresponds to a cache line of victim data which has been evicted from a higher-level cache in response to a read miss of said higher-level cache.

3. The cache memory subsystem as recited in claim 2, wherein said scheduler is further configured to perform said associated write to a storage location within said cache storage having an address corresponding to said cache line of victim data.

4. The cache memory subsystem as recited in claim 1, wherein said associated write corresponds to a cache line of fill data from a system memory.

5. The cache memory subsystem as recited in claim 4, wherein said scheduler is further configured to perform said associated write to a storage location within said cache storage having an address corresponding to said read request.

6. The cache memory subsystem as recited in claim 1, wherein in response to scheduling said read request, said scheduler is further configured to provide an indication that said read request is scheduled and that a read response will follow.

7. The cache memory subsystem as recited in claim 6, wherein said scheduler is further configured to provide said indication a predetermined amount of time before said read response.

8. The cache memory subsystem as recited in claim 7, wherein said predetermined amount of time is programmable.

9. The cache memory subsystem as recited in claim 1 further comprising a tag storage configured to store a plurality of tags each corresponding to a respective cache line of said plurality of cache lines.

10. A method comprising:
   storing a plurality of cache lines of data in a cache storage;
   scheduling reads and writes of information to said cache storage using a fixed latency pipeline;
   wherein in response to scheduling a read request to said cache storage, causing an associated write to said cache storage to occur a fixed number of cycles after said scheduling a read request.

11. The method as recited in claim 10, wherein said associated write corresponds to a cache line of victim data which has been evicted from a higher-level cache in response to a read miss of said higher-level cache.

12. The method as recited in claim 11 further comprising performing said associated write to a storage location within said cache storage having an address corresponding to said cache line of victim data.

13. The method as recited in claim 10, wherein said associated write corresponds to a cache line of fill data from a system memory.

14. The method as recited in claim 13 further comprising performing said associated write to a storage location within said cache storage having an address corresponding to said read request.

15. The method as recited in claim 10 further comprising providing an indication that said read request is scheduled and that a read response will follow in response to scheduling said read request.

16. The method as recited in claim 15 further comprising providing said indication a predetermined amount of time before said read response.

17. The method as recited in claim 16, wherein said predetermined amount of time is programmable.

18. A microprocessor comprising:
   an execution unit configured to execute instructions and operate on data;
   a higher-level cache memory subsystem coupled to store a first plurality of cache lines of said data in a first cache storage;
   a lower-level cache subsystem coupled to said higher-level cache subsystem, wherein said lower-level cache subsystem includes:
      a second cache storage configured to store a second plurality of cache lines of said data;
      a scheduler configured to schedule reads and writes of information to said second cache storage using a fixed latency pipeline;
      wherein in response to scheduling a read request from said higher-level cache subsystem, said scheduler is further configured to cause an associated write to said second cache storage to occur a fixed number of cycles after said scheduling a read request.

19. The microprocessor as recited in claim 18, wherein said associated write corresponds to a cache line of victim data which has been evicted from a higher-level cache in response to a read miss of said higher-level cache.

20. The microprocessor as recited in claim 19, wherein said scheduler is further configured to perform said associated write to a storage location within said cache storage having an address corresponding to said cache line of victim data.

21. The microprocessor as recited in claim 18, wherein said associated write corresponds to a cache line of fill data from a system memory.

22. The microprocessor as recited in claim 19, wherein said scheduler is further configured to perform said associated write to a storage location within said cache storage having an address corresponding to said read request.

23. The microprocessor as recited in claim 18, wherein in response to scheduling said read request, said scheduler is further configured to provide an indication for said higher-level cache memory subsystem that said read request is scheduled and that a read response will follow.

24. The microprocessor as recited in claim 23, wherein said scheduler is further configured to provide said indication a predetermined amount of time before said read response.

25. The microprocessor as recited in claim 24, wherein said predetermined amount of time is programmable.

26. The microprocessor as recited in claim 18, wherein said higher-level cache memory subsystem is a level one (L1) cache and said lower-level cache memory subsystem is a level two (L2) cache.

* * * * *